US012122927B2

(12) United States Patent
Nakashima et al.

(10) Patent No.: US 12,122,927 B2
(45) Date of Patent: Oct. 22, 2024

(54) INK COMPOSITION FOR PHOTO-CURABLE INKJET PRINTING

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 694 days.

(21) Appl. No.: 17/413,838

(22) PCT Filed: Nov. 28, 2019

(86) PCT No.: PCT/JP2019/046653
§ 371 (c)(1),
(2) Date: Jun. 14, 2021

(87) PCT Pub. No.: WO2020/166172
PCT Pub. Date: Aug. 20, 2020

(65) Prior Publication Data
US 2022/0056293 A1    Feb. 24, 2022

(30) Foreign Application Priority Data
Feb. 12, 2019 (JP) .................. 2019-022899

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/037* | (2014.01) | |
| *C09D 11/101* | (2014.01) | |
| *C09D 11/107* | (2014.01) | |
| *C09D 11/322* | (2014.01) | |
| *C09D 11/38* | (2014.01) | |

(52) U.S. Cl.
CPC ............ *C09D 11/38* (2013.01); *C09D 11/037* (2013.01); *C09D 11/101* (2013.01); *C09D 11/107* (2013.01); *C09D 11/322* (2013.01)

(58) Field of Classification Search
CPC ... C09D 11/037; C09D 11/107; C09D 11/101; C09D 11/322; C09D 11/38
USPC ............ 522/30, 7, 6, 189, 184, 71, 1; 520/1
See application file for complete search history.

(56) References Cited

U.S. PATENT DOCUMENTS

| | | | | |
|---|---|---|---|---|
| 2011/0236647 A1* | 9/2011 | Tsuchiya | ............. | C09D 11/322 522/167 |
| 2015/0376424 A1 | 12/2015 | Illsley et al. | | |
| 2016/0185987 A1 | 6/2016 | Saito et al. | | |
| 2017/0158890 A1 | 6/2017 | Hirose et al. | | |
| 2019/0062580 A1 | 2/2019 | Nakashima et al. | | |
| 2023/0257608 A1* | 8/2023 | Nakashima | .......... | C09D 11/107 522/8 |

FOREIGN PATENT DOCUMENTS

| | | | | |
|---|---|---|---|---|
| EP | 2832553 A1 | 2/2015 | | |
| EP | 3904469 A1 | 11/2021 | | |
| JP | 2009035650 A | 2/2009 | | |
| JP | 2011052107 A | 3/2011 | | |
| JP | 2013208807 A | 10/2013 | | |
| JP | 2015163701 A | 9/2015 | | |
| JP | 2016020457 A | 2/2016 | | |
| JP | 2016079385 A | 5/2016 | | |
| JP | 2016514174 A | 5/2016 | | |
| JP | 2016210975 A | 12/2016 | | |
| JP | 2018122431 | * | 8/2018 | |
| JP | 2018122431 A | * | 8/2018 | ............... B41J 2/01 |
| JP | 2018188581 A | 11/2018 | | |
| WO | 2014126720 A1 | 8/2014 | | |
| WO | 2015005453 A1 | 1/2015 | | |
| WO | 2016186838 A1 | 11/2016 | | |
| WO | 2017095786 A1 | 6/2017 | | |
| WO | 2017145671 A1 | 8/2017 | | |
| WO | 2017180491 A1 | 10/2017 | | |

OTHER PUBLICATIONS

Araki et al., JP 2018122431 Machine Translation, Aug. 9, 2018 (Year: 2018).*
ISR issued in Int'l. Application No. PCT/JP2019/046653, mailed Feb. 25, 2020.
Office action issued in European patent application No. 19 915 009.5, dated Oct. 27, 2023.
European Search Report issued in EP 19 91 5009, dated Oct. 25, 2022.
IPRP issued in Int'l. Application No. PCT/JP2019/046653, mailed Aug. 26, 2021.

* cited by examiner

*Primary Examiner* — Jessica Whiteley
(74) *Attorney, Agent, or Firm* — Greer Burns & Crain Ltd.

(57) ABSTRACT

Provided is a photo-curable inkjet printing ink composition, comprising (A) an acrylicated amine compound having two photopolymerizable functional groups and two amino groups in a molecule, (B) a (meth)acrylic monomer having an alkoxy group, and (C) at least one selected from the group consisting of hexanediol acrylate, 3-methyl-1,5-pentanediol diacrylate, dipropylene glycol diacrylate, and neopentyl glycol diacrylate hydroxypivalate, wherein a content of the component (A) is 3 to 18% by mass in the ink composition, wherein a content of the component (B) is 5 to 35% by mass in the ink composition, and wherein a content of the component (C) is 30 to 60% by mass in the ink composition.

4 Claims, No Drawings

INK COMPOSITION FOR PHOTO-CURABLE INKJET PRINTING

This is a National Phase Application filed under 35 U.S.C. § 371, of International Application No. PCT/JP2019/046653, filed Nov. 28, 2019, the contents of which are incorporated by reference.

TECHNICAL FIELD

The present invention relates to an ink composition for photo-curable inkjet printing. More specifically, the present invention relates to an ink composition for photo-curable inkjet printing which has low odor, is capable of being printed on a corrugated cardboard sheet or the like, has an excellent abrasion resistance, and has an excellent bending resistance even when the corrugated cardboard sheet or the like is bent.

BACKGROUND ART

Conventionally, an active energy ray-curable ink which has low odor, has an excellent abrasion resistance, and is intended for being printed on a corrugated cardboard sheet or the like is known. Patent Document 1 discloses an active energy ray-curable ink comprising a photopolymerization initiator and a diallyl phthalate resin.

PRIOR ART DOCUMENT

Patent Document

Patent Document 1: JP 2016-210975 A

SUMMARY OF THE INVENTION

However, the ink described in Patent Document 1 has room for improvement in odor and bending resistance when the corrugated cardboard sheet or the like is bent.

The present invention has been made in view of such conventional problems, and it is an object of the present invention to provide an ink composition for photo-curable inkjet printing which has low odor, is capable of being printed on a corrugated cardboard sheet or the like, has an excellent abrasion resistance, and has an excellent bending resistance even when the corrugated cardboard sheet or the like is bent.

As a result of intensive studies to solve the above-described problems, the present inventors have found that the above-described problems can be solved by an ink composition for photo-curable inkjet printing comprising a predetermined amount of (A) an acrylated amine compound having two photopolymerizable functional groups and two amino groups in a molecule, (B) a (meth)acrylic monomer having an alkoxy group, and (C) at least one selected from the group consisting of hexanediol acrylate, 3-methyl-1,5-pentanediol diacrylate, dipropylene glycol diacrylate, and neopentyl glycol diacrylate hydroxypivalate, and completed the present invention.

The ink composition for photo-curable inkjet printing of the present invention that solves the above-described problems comprises (A) an acrylated amine compound having two photopolymerizable functional groups and two amino groups in a molecule, (B) a (meth)acrylic monomer having an alkoxy group, and (C) at least one selected from the group consisting of hexanediol acrylate, 3-methyl-1,5-pentanediol diacrylate, dipropylene glycol diacrylate, and neopentyl glycol diacrylate hydroxypivalate, wherein a content of the component (A) is 3 to 18% by mass in the ink composition, wherein a content of the component (B) is 5 to 35% by mass in the ink composition, and wherein a content of the component (C) is 30 to 60% by mass in the ink composition.

EMBODIMENT FOR CARRYING OUT THE INVENTION

<Ink Composition for Photo-Curable Inkjet Printing>

The ink composition for photo-curable inkjet printing according to one embodiment of the present invention (hereinafter, also referred to as an ink composition) comprises (A) an acrylated amine compound having two photopolymerizable functional groups and two amino groups in a molecule, (B) a (meth)acrylic monomer having an alkoxy group, (C) at least one selected from the group consisting of hexanediol acrylate, 3-methyl-1,5-pentanediol diacrylate, dipropylene glycol diacrylate, and neopentyl glycol diacrylate hydroxypivalate, and (D) a photopolymerization initiator. The content of the component (A) is 3 to 18% by mass in the ink composition. The content of the component (B) is 5 to 35% by mass in the ink composition. The content of the component (C) is 30 to 60% by mass in the ink composition. Each will be described below.

(Component (A))

The ink composition of the present embodiment comprises an acrylated amine compound having two photopolymerizable functional groups and two amino groups in a molecule as a component (A).

The acrylicated amine compound having two photopolymerizable functional groups and two amino groups in the molecule is not particularly limited. By way of an example, examples of the photopolymerizable functional group in the acrylated amine compound include a functional group which may undergo polymerization reaction with visible light or invisible light including ionizing radiation such as ultraviolet rays and electron beams to form a cross-linking bond between molecules. Moreover, examples of the photopolymerizable functional group include both a photopolymerizable functional group in a narrow sense which is directly activated by light irradiation to undergo a photopolymerization reaction, and a photopolymerizable functional group in a broad sense which initiates and promotes a photopolymerization reaction due to action of an active species generated from a photopolymerization initiator when irradiated with light with the photopolymerizable functional group and the photopolymerization initiator coexisting.

The photopolymerizable functional group is one having a photoradical polymerization reactivity such as an ethylenic double bond, one having a photocationic polymerization reactivity and a photocationic polymerization reactivity such as a cyclic ether group such as an epoxy group, or the like. Among them, the photopolymerizable functional group is preferably an ethylenic double bond such as a (meth)acryloyl group, a vinyl group, and an allyl group, more preferably a (meth)acryloyl group. In the photopolymerizable compound, it is preferable that two photopolymerizable functional groups are both (meth)acryloyl groups and that an amine value is 130 to 142 KOHmg/g. Besides, in the present embodiment, an amine value means an amine value per 1 g of solid content, which is converted to an equivalent of potassium hydroxide after measurement by a potentiometric titration method (for example, COMITE (AUTO TITRATOR COM-900, BURET B-900, TITSTATIONK-900) manufactured by HIRANUMA Co., Ltd.) using a 0.1N aqueous hydrochloric acid.

The photopolymerizable compound is preferably an acrylated amine compound obtained by reacting a bifunctional (meth)acrylate with an amine compound. The bifunctional (meth)acrylate is alkylene glycol di(meth)acrylate such as 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate, and neopentyl glycol di(meth)acrylate, di(meth)acrylate of alkylene oxide adduct of bisphenol such as di(meth)acrylate of ethylene oxide adduct of bisphenol A, di(meth)acrylate of ethylene oxide adduct of bisphenol F, di(meth)acrylate of ethylene oxide adduct of bisphenol S, di(meth)acrylate of ethylene oxide adduct of thiobisphenol, and di(meth)acrylate of ethylene oxide adduct of brominated bisphenol A, polyalkylene glycol di(meth)acrylate such as polyethylene glycol di(meth)acrylate and polypropylene glycol di(meth)acrylate, di(meth)acrylate of hydroxypivalic acid neopentyl glycol ester, or the like. Among them, the bifunctional (meth)acrylate is preferably 1,6-hexanediol di(meth)acrylate.

The amine compound is a monofunctional amine compound such as benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, and n-octadecylamine, a polyfunctional amine compound such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexylnomethane), isophoronediamine, 1,3-diaminocyclohexane, and spiroacetal-based diamine, or the like. Moreover, the amine compound may be a high molecular weight type of polyfunctional amine compound such as polyethyleneimine, polyvinylamine, and polyallylamine.

The above-described acrylated amine compound is preferably a compound obtained by reacting 1,6-hexanediol di(meth)acrylate with an amine compound. Specifically, the acrylated amine compound is CN371 (manufactured by Sartomer), EB7100 (EBECRYL 7100, manufactured by Cytec), Agi008 (manufactured by DSM), or the like.

The content of the component (A) may be 3% by mass or more, preferably 6% by mass or more, in the ink composition. Moreover, the content of the component (A) may be 18% by mass or less, preferably 15% by mass or less, in the ink composition. When the content of the component (A) is less than 3% by mass, the ink composition tends to be inferior in curability. On the other hand, when the content of the component (A) exceeds 18% by mass, the ink composition tends to have reduced storage stability and ejection stability.

(Component (B))

The ink composition of the present embodiment comprises a (meth)acrylic monomer having an alkoxy group as a component (B). The (meth)acrylic monomer having an alkoxy group is not particularly limited. By way of an example, examples of the (meth)acrylic monomer include various monofunctional (meth)acrylate monomers, bifunctional (meth)acrylate monomers, trifunctional (meth)acrylate monomers, tetrafunctional or higher polyfunctional acrylate monomers, which have low odor, and the like.

Specific examples of the (meth)acrylic monomer include 2-(2-ethoxyethoxy)ethyl acrylate, ethoxylated(3) trimethylolpropane triacrylate, propoxylated(2) neopentyl glycol diacrylate, phenoxypolyethylene glycol acrylate, and the like.

The content of the component (B) may be 5% by mass or more, preferably 15% by mass or more, in the ink composition. Moreover, the content of the component (B) may be 35% by mass or less, preferably 25% by mass or less, in the ink composition. When the content of the component (B) is less than 5% by mass, the ink composition tends to be inferior in bending resistance. On the other hand, when the content of the component (B) exceeds 35% by mass, the ink composition tends to be inferior in abrasion resistance.

The ink composition of the present embodiment preferably comprises the above-described polyfunctional (meth)acrylate monomer as a component (B). When it comprises polyfunctional (meth)acrylate as a component (B), a content of polyfunctional (meth)acrylate is preferably 30% by mass or more in the component (B). Moreover, the content of polyfunctional (meth)acrylate may be 100% by mass in the component (B). When the content of polyfunctional (meth)acrylate is within the above-described ranges, the ink composition has an advantage of being excellent in abrasion resistance.

(Component (C))

The ink composition of the present embodiment comprises at least one selected from the group consisting of hexanediol acrylate, 3-methyl-1,5-pentanediol diacrylate, dipropylene glycol diacrylate, and hydroxypivalic acid neopentyl glycol diacrylate as a component (C), from the viewpoints of abrasion resistance and odor.

The content of the component (C) is preferably 30% by mass or more in the ink composition. Moreover, the content of the component (C) is more preferably 60% by mass or less in the ink composition. When the content of the component (C) is less than 30% by mass, the ink composition tends to be inferior in curability and abrasion resistance. On the other hand, when the content of the component (C) exceeds 60% by mass, the ink composition tends to be inferior in bending resistance.

(Component (D))

The ink composition of the present embodiment appropriately comprises a photopolymerization initiator as a component (D). The photopolymerization initiator is not particularly limited. By way of an example, the photopolymerization initiator is benzophenone, diethylthioxanthone, 2-methyl-1-(4-methylthio)phenyl-2-morpholinopropan-1-one, 4-benzoyl-4'-methyldiphenylsulfide, 1-chloro-4-propoxythioxanthone, isopropylthioxanthone, 2-hydroxy-2-methyl-1-phenylpropan-1-one, 1-hydroxycyclohexylphenylketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyl-diphenylphosphine oxide, 2-benzyl-2-dimethylamino-1-(morpholinophenyl)-butane-1-one, or the like. Such photopolymerization initiators are commercially available, and can be obtained, for example, under trade names of Irgacure 907, Irgacure 369, Irgacure 184, Irgacure 379, Irgacure 819, TPO, etc. from BASF, and under trade names of DETX, etc. from Lamberti. The photopolymerization initiator may be used in combination.

A content of the component (D) is not particularly limited. By way of an example, when ultraviolet rays (UV) or ultraviolet rays (light emitting diodes (LEDs)) are used as light sources, the content of the component (D) is preferably 3% by mass or more, more preferably 4% by mass or more, in the ink composition. Moreover, the content of the component (D) is preferably 15% by mass or less, more preferably 10% by mass or less, in the ink composition. When the content of the component (D) is within the above-described ranges, the ink composition can have sufficient curability and internal curability, and low cost. Besides, when an electron beam is used as a light source, the component (D) may not be added.

(Sensitizer)

The ink composition for photo-curable inkjet printing of the present embodiment can be further used in combination with a photosensitizer (compound) that has light absorption characteristics mainly in a wavelength range of ultraviolet rays of 400 nm or more and expresses a sensitizing function of a curing reaction by light having a wavelength in that range in order to promote curability against ultraviolet rays using a light emitting diode (LED) as a light source. Besides, "expressing a sensitizing function of a curing reaction by light having a wavelength of 400 nm or more" described above means having light absorption characteristics in a wavelength range of 400 nm or more. By using such a sensitizer, the ink composition of the present embodiment can be promoted in LED curability.

The above-described photosensitizer is an anthracene-based sensitizer, a thioxanthone-based sensitizer, or the like, preferably a thioxanthone-based sensitizer. The photosensitizer may be used in combination. Specifically, the photosensitizer is an anthracene-based sensitizer such as 9,10-dibutoxyanthracene, 9,10-diethoxyanthracene, 9,10-dipropoxyanthracene, and 9,10-bis(2-ethylhexyloxy) anthracene, a thioxanthone-based sensitizer such as 2,4-diethylthioxanthone, 2-isopropylthioxanthone, and 4-isopropylthioxanthone, or the like. Representative examples of commercially available products include DBA and DEA (manufactured by KAWASAKI KASEI CHEMICALS LTD.) as anthracene-based sensitizers, DETX and ITX (manufactured by Lambson Ltd.) as thioxanthone-based sensitizers, and the like.

When the ink composition comprises a photosensitizer, a content of the photosensitizer is preferably more than 0% and 5.0% by mass or less in the ink composition. When the content of the photosensitizer exceeds 5.0% by mass, an effect of compounding the photosensitizer becomes difficult to improve in the ink composition, and there is a tendency of excessive addition.

Besides, when the ink composition comprises a thioxanthone-based sensitizer as a photosensitizer, the ink composition easily turns yellow. Therefore, the ink composition has a more yellowish hue than a color based on a pigment (original hue), and thus it is preferable to appropriately determine a content of the thioxanthone-based sensitizer for each color. Specifically, in a white ink composition and a clear ink composition that are easily affected by a change in color, it is preferable that the ink composition does not comprise a thioxanthone-based sensitizer as a photosensitizer. Moreover, in a magenta ink composition and a cyan ink composition, since a vinylamide compound is used in combination as a photopolymerizable compound, a cured coating film, which was discolored to yellow, fades, and a change in hue easily becomes a problem. Therefore, it is preferable to use a photosensitizer within a range in which there is no problem in hue. Furthermore, since a black ink composition and a yellow ink composition are less likely to affect hue even if they are discolored and they have poorer photopolymerizability than other hue, it is preferable to use a thioxanthone-based sensitizer in combination as a photopolymerization initiator.

(Component (E))

The ink composition of the present embodiment appropriately comprises a (meth)acrylic monomer having a hydroxyl group as a component (E). The (meth)acrylic monomer having a hydroxyl group is not particularly limited. By way of an example, the acrylic monomer having a hydroxyl group is (meth)acrylic acid hydroxyalkyl ester such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 6-hydroxyhexyl (meth)acrylate, and 8-hydroxyoctyl (meth)acrylate, glycol mono (meth)acrylate such as polyethylene glycol mono (meth)acrylate, polypropylene glycol mono (meth)acrylate, and 1,4-cyclohexanedimethanol mono (meth)acrylate, caprolactone modified (meth)acrylate, hydroxyethyl acrylamide, or the like. Among them, the monomer having a hydroxyl group is preferably a (meth)acrylic monomer having a hydroxyl group such as 4-hydroxybutyl (meth)acrylic acid having low odor from the viewpoint of odor. The (meth)acrylic monomer having a hydroxyl group may be used in combination.

When the ink composition comprises a component (E), a content of the component (E) is not particularly limited. By way of an example, the content of the component (E) is preferably 3% by mass or more, more preferably 4% by mass or more, in the ink composition. Moreover, the content of the component (E) is preferably 20% by mass or less in the ink. When the content of the component (E) is within the above-described ranges, the ink composition has low odor. Furthermore, the ink composition is more excellent in bending resistance even when it is printed on a corrugated cardboard sheet or the like and the corrugated cardboard sheet or the like is bent.

(Component (F))

The ink composition of the present embodiment appropriately comprises a colorant as a component (F). When the ink composition comprises a colorant, the ink composition can produce an ink composition of each color.

The colorant is not particularly limited. By way of an example, as a colorant, conventionally used pigments and dyes can be used without particular limitation, and pigments such as organic pigments and inorganic pigments are preferable. The colorant may be used in combination.

The organic pigments are dye lake pigments, azo-based, benzoimidazolone-based, phthalocyanine-based, quinacridone-based, anthraquinone-based, dioxazine-based, indigo-based, thioindigo-based, perylene-based, perinone-based, diketo-pyrrolo-pyrrole-based, isoindolinone-based, nitro-based, nitroso-based, anthraquinone-based, flavanthrone-based, quinophthalone-based, pyranthrone-based, or indanthrone-based pigments, or the like.

The inorganic pigments are colored pigments such as titanium oxide, red oxide, antimony red, cadmium yellow, cobalt blue, ultramarine blue, navy blue, iron black, chrome oxide green, carbon black, and graphite (including achromatic color pigments such as white and black), extender pigments such as calcium carbonate, kaolin, clay, barium sulfate, aluminum hydroxide, and talc, or the like.

Specific examples of representative pigments for each hue of the ink composition of the present embodiment are as follows. A yellow pigment is C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, or the like, preferably C. I. Pigment Yellow 150, 155, 180, 213, or the like.

A magenta pigment is C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, or the like, preferably C. I. Pigment Red 122, 202, Pigment Violet 19, or the like.

A cyan pigment is C. I. Pigment Blue 1, 2, 3, 15, 15:1, 15:2, 15:3, 15:4, 15:6, 16, 18, 22, 27, 29, 60, or the like, preferably C. I. Pigment Blue 15:4 or the like.

A black pigment is carbon black (C. I. Pigment Black 7) or the like.

A white pigment is titanium oxide, aluminum oxide, or the like, preferably titanium oxide surface-treated with various materials such as alumina and silica or, the like.

A content of the colorant is preferably 1% by mass or more in the ink composition. Moreover, the content of the colorant is preferably 20% by mass or less in the ink composition. When the content of the colorant is within the above-described ranges, the ink composition has an appropriate image quality of a printed matter to be obtained and is excellent in viscosity property.

(Component (G))

The ink composition of the present embodiment may comprise a vinyl monomer as a component (G). The vinyl monomer is not particularly limited. By way of an example, the vinyl monomer is ethylene glycol divinyl ether, triethylene glycol divinyl ether, diethylene glycol divinyl ether, 1,4-cyclohexanedimethanol divinyl ether, ethylene glycol monovinyl ether, propylene glycol divinyl ether, dipropylene glycol divinyl ether, butanediol divinyl ether, hexanediol divinyl ether, trimethylolpropane trivinyl ether, or the like.

Among them, the vinyl monomer is preferably triethylene glycol divinyl ether or the like having low odor.

When the ink composition comprises a component (G), a content of the component (G) is not particularly limited. By way of an example, the content of the component (G) is preferably 1% by mass or more in the ink composition. Moreover, the content of the component (G) is more preferably 20% by mass or less in the ink composition. When the content of the component (G) is within the above-described ranges, the ink composition has low odor. Furthermore, the ink composition is more excellent in bending resistance even when it is printed on a corrugated cardboard sheet or the like and the corrugated cardboard sheet or the like is bent.

Moreover, the ink composition of the present embodiment can contain a photopolymerizable compound having low odor as long as the performance is not deteriorated.

(Optional Components)

The ink composition of the present embodiment may be compounded with various additives as optional components in order to express various functionalities, as necessary. Examples of optional components include, for example, a surface treatment agent, a light stabilizer, an antioxidant, an anti-aging agent, a cross-linking accelerator, a polymerization inhibitor, a plasticizer, a preservative, a pH adjusting agent, an anti-forming agent, moisturizing agent, and the like.

•Surface Treatment Agent

The ink composition of this embodiment appropriately comprises a surface treatment agent. The surface treatment agent is not particularly limited. By way of an example, the surface treatment agent is a silicone-based surface treatment agent, a fluorine-based surface treatment agent, an acetylene-based surface treatment agent, or the like. An acetylene diol-based surface treatment agent is Dynol 607, Dynol 609, EXP-4001, EXP-4300, OLFINE E1010 (manufactured by Nissin Chemical Co., Ltd.), or the like. A silicone-based surfactant is BYK-307, 333, 347, 348, 349, 345, 378, 3455 (manufactured by BYK-Chemie), or the like. A fluorine-based surfactant is F-410, 444, 554 (manufactured by DIC CORPORATION), FS-65, 34, 35, 31, 30 (manufactured by DuPont), or the like.

When the ink composition comprises a surface treatment agent, a content of the surface treatment agent is not particularly limited. By way of an example, the content of the surface treatment agent is preferably an amount such that a surface tension of the ink composition is 25 to 40 mN/m, more preferably 0.1 to 1.5% by mass in the ink composition.

•Polymerization Inhibitor

The polymerization inhibitor is not particularly limited. By way of an example, the polymerization inhibitor is a N—CH$_3$ type, N—H type, N—OR type hindered amine, etc., or a phenol-based, amine-based, sulfur-based, phosphorus-based polymerization inhibitor, etc.

•Anti-Forming Agent

The anti-forming agent is a silicone-based anti-forming agent, a pluronic-based anti-forming agent, or the like.

Returning back to the general description of the ink composition, the ink composition of the present embodiment preferably has a viscosity of 30 mPa·s or less, more preferably 20 mPa·s or less, at 25° C. The ink composition is compounded with a viscosity modifier or the like, as necessary. Besides, in the present embodiment, the viscosity can be measured at 25° C. using an E-type viscometer (REl00L-type viscometer, manufactured by Toki Sangyo Co., Ltd.).

<Preparation Method of Ink Composition>

A method of preparing the ink composition of the present embodiment is not particularly limited. By way of an example, the ink composition can be prepared by being dispersed and mixed using a disperser such as a wet type circulation mill, a bead mill, a ball mill, a sand mill, an attritor, a roll mill, a DCP mill, an agitator, a Henschel mixer, a colloid mill, an ultrasonic homogenizer, a high-pressure homogenizer (Micro fluidizer, Nanomizer, Ultimizer, Genus PY, DeBEE2000, etc.), and a pearl mill.

<Producing Method of Printed Matter>

Next, a method of producing a printed matter using the ink composition of the present embodiment will be described.

The method for producing a printed matter of the present embodiment includes a step of printing the above-described ink composition on a base material by an inkjet method.

The base material is not particularly limited. By way of an example, the base material is each tree resin base material, paper, capsule, gel, metal foil, glass, wood, cloth, or the like. The ink composition of the present embodiment exhibits an excellent bending resistance even when the base material is bent after being printed on the base material. Therefore, the ink composition is particularly appropriately used when the base material is a base material used for bending applications such as a corrugated cardboard sheet.

When the base material is a corrugated cardboard sheet such as a C liner and a K liner, the ink composition may be directly applied to the corrugated cardboard sheet, and may be applied after providing the corrugated cardboard sheet with a primer layer or a corona discharge treatment, etc. That is, in recent years, used paper, recycled paper, or the like may be used as a corrugated cardboard sheet in order to consider the environment. When a K liner is used as a corrugated cardboard sheet, it has a rough unevenness surface, is unclear in color tone, and has a high ink permeability when printed. Therefore, when the ink composition is printed on the corrugated cardboard sheet, a brown color of a liner base paper, which is a substrate, easily causes deterioration of a print quality. In particular, when a color of the substrate appears in the printed portion, the inkjet image looks dull, and the appearance of the printed matter may be impaired. A primer layer is appropriately provided on such a corrugated cardboard sheet in order to eliminate the unevenness and the like.

The primer layer is provided for the purposes of adjusting the whiteness and color of the liner base paper constituting the corrugated cardboard sheet, increasing the whiteness of the substrate, and the like. The primer layer can be formed by applying a pre-coating agent comprising a pigment and an adhesive.

The pigment is not particularly limited. By way of an example, examples of the pigment include titanium dioxide (anatase, rutile), as well as an extender pigment such as aluminum hydroxide, barium sulfate, calcium carbonate, amorphous silica, and clay. Moreover, a content of a white pigment is preferably 20 to 85 parts by mass, more preferably 20 to 80 parts by mass, in 100 parts by mass of the pre-coating agent.

In the present embodiment, a binder resin used for the pre-coating agent for the corrugated cardboard is preferably an aqueous resin. The aqueous resin is preferably a natural resin, a synthetic resin, or the like, more preferably a starch derivative, casein, shellac, a polyvinyl alcohol derivative, an acryl-based resin, a maleic acid-based resin, or the like. More specifically, as an aqueous resin, an aqueous acryl-based resin obtained by copolymerizing acrylic acid or methacrylic acid and an alkyl ester thereof or styrene as main monomer components, an aqueous styrene-acrylic resin, an aqueous styrene-maleic acid resin, an aqueous styrene-acrylic acid-maleic acid resin, an aqueous polyurethane resin, an aqueous polyester resin, or the like is appropriately used. A content of the binder resin is preferably 1 to 25 parts by mass, more preferably 1 to 15 parts by mass, in 100 parts by mass of the pre-coating agent.

Examples of an aqueous medium that can be used in the pre-coating agent of the present embodiment include water or a mixture of water and a water-miscible solvent. The water-miscible solvents are lower alcohols, polyhydric alcohols, or alkyl ethers or alkyl esters thereof. Specifically, the water-miscible solvents are lower alcohols such as methyl alcohol, ethyl alcohol, normal propyl alcohol, and isopropyl alcohol, polyhydric alcohols such as ethylene glycol, propylene glycol, diethylene glycol, dipropylene glycol, and glycerin, ethylene glycol monomethyl ether, ethylene glycol monoethyl ether, ethylene glycol monoacetate, propylene glycol monomethyl ether, propylene glycol monoethyl ether, propylene glycol monoacetate, diethylene glycol monomethyl ether, dipropylene glycol monomethyl ether, or the like.

In addition to the components shown above, various additives such as a film-forming agent, a pigment dispersant or a pigment-dispersing resin, an antiblocking agent, a wetting agent, a viscosity regulator, a pH adjusting agent, an anti-foaming agent, and a general surfactant can be appropriately selected and used for pre-coating used in the present embodiment, as necessary.

A method of producing a pre-coating agent using these various materials is not particularly limited. By way of an example, as the method of producing a pre-coating agent, a method of mixing and kneading a white pigment, an aqueous binder resin, water, a water-miscible solvent if necessary, and a pigment dispersant or a pigment-dispersing resin, and further adding and mixing an additive, water, a water-miscible solvent if necessary, and the remaining of the predetermined materials is generally known.

Besides, the pre-coating agent of the present embodiment can be easily obtained by mixing the above-described components in a required amount, and mixing and dispersing them with a high-speed stirrer such as a homo mixer and a laboratory mixer, or a disperser such as a three-roll mill and a bead mill.

When a primer layer is provided, a thickness of the primer layer (a coating amount of the pre-coating agent) is not particularly limited. The primer layer preferably has a coating amount of a solid content in a range of 0.1 to 5 $g/m^2$. When the thickness of the primer layer (the coating amount of the pre-coating agent) is within the above-described range, whiteness and color of a corrugated cardboard sheet are easy to be appropriately adjusted.

Returning back to the descriptions of the ink composition, a method of curing the ink composition is not particularly limited. By way of an example, the ink composition can be cured by being irradiated with light after being ejected to a base material. A light source that irradiates with light is not particularly limited. By way of an example, the light source is an ultraviolet ray, an electron beam, a visible ray, a light emitting diode (LED), or the like.

Specifically, ejection to the base material can be performed by feeding the above-described ink composition to a printer head of a printer device for inkjet method and ejecting it from this printer head to the base material so that a film thickness of a coating film is 1 to 20 µm. Exposure and curing with light (curing of an image) can be performed by irradiating an ink composition coated on a base material as an image with light.

As described above, the ink composition of the present embodiment has low odor. Moreover, the ink composition for photo-curable inkjet printing can be printed on a corrugated cardboard sheet or the like, has an excellent abrasion resistance, and is excellent in bending resistance even when the corrugated cardboard sheet or the like is bent.

One embodiment of the present invention has been described above. The present invention is not particularly limited to the above-described embodiment. Besides, the above-described embodiment mainly describes an invention having the following configurations.

(1) An ink composition for photo-curable inkjet printing, comprising (A) an acrylated amine compound having two photopolymerizable functional groups and two amino groups in a molecule, (B) a (meth)acrylic monomer having an alkoxy group, and (C) at least one selected from the group consisting of hexanediol acrylate, 3-methyl-1,5-pentanediol diacrylate, dipropylene glycol diacrylate, and neopentyl glycol diacrylate hydroxypivalate, wherein a content of the component (A) is 3 to 18% by mass in the ink composition, wherein a content of the component (B) is 5 to 35% by mass in the ink composition, and wherein a content of the component (C) is 30 to 60% by mass in the ink composition.

According to such a configuration, an ink composition for photo-curable inkjet printing to be obtained has low odor. Moreover, the ink composition for photo-curable inkjet printing can be printed on a corrugated cardboard sheet or the like, has an excellent abrasion resistance, and is excellent in bending resistance even when the corrugated cardboard sheet or the like is bent.

(2) The ink composition for photo-curable inkjet printing of (1), wherein the component (B) comprises a polyfunctional (meth)acrylate monomer, and a content of the polyfunctional (meth)acrylate monomer is 30 to 100% by mass in the component (B).

According to such a configuration, an ink composition for photo-curable inkjet printing to be obtained has low odor. Moreover, the ink composition for photo-curable inkjet printing can be printed on a corrugated cardboard sheet or the like, and has an excellent abrasion resistance.

(3) The ink composition for photo-curable inkjet printing of (1) or (2), further comprising (D) a photopolymerization initiator.

According to such a configuration, when ultraviolet rays (UV) and ultraviolet rays (light emitting diodes (LEDs)) are used as light sources, the ink composition for photo-curable inkjet printing has an excellent curability.

(4) The ink composition for photo-curable inkjet printing of any one of (1) to (3), further comprising (E) a (meth) acrylic monomer having a hydroxyl group, wherein a content of the component (E) is 3 to 20% by mass in the ink composition.

According to such a configuration, an ink composition for photo-curable inkjet printing to be obtained has low odor. Moreover, the ink composition for photo-curable inkjet printing can be printed on a corrugated cardboard sheet or the like, has low odor, and is more excellent in bending resistance.

(5) The ink composition for photo-curable inkjet printing of any one of (1) to (4), further comprising (F) a colorant.

According to such a configuration, an ink composition for photo-curable inkjet printing to be obtained can be printed on a corrugated cardboard sheet or the like, has low odor, and is useful as an ink composition of each color having a more excellent bending resistance.

Example

Hereinafter, the present invention will be described in more detail with reference to Examples. The present invention is not limited to these Examples. Besides, unless otherwise specified, "% means by mass", and "part" means "part by mass".

Raw materials used and a preparation method are shown below.

<Colorant>
PV19
PV23
PY150
PB15: 4
PB7
PO13
PG7

<Pigment Dispersant>
PB822: Manufactured by Ajinomoto Fine-Techno Co., Inc.

<Photopolymerizable Compound>
(A) Acrylated Amine Compound:
 Oligomer of acrylated amine compound having 2 photopolymerizable functional groups and two amino groups in a molecule (CN371: manufactured by Sartomer)
(B) (Meta)Acrylic Monomer Having an Alkoxy Group:
 Ethyl carbitol acrylate (SR256, manufactured by Sartomer)
 Ethoxylated(3) trimethylolpropane triacrylate (SR454, manufactured by Sartomer)
 Propoxylated(2) neopentyl glycol diacrylate (SR9003, manufactured by Sartomer)
(C):
 3-methyl-1,5-pentanediol diacrylate: Component (A), (Trade name: Light Acrylate MPD-A, manufactured by Kyoeisha Chemical Co., Ltd.)
 Dipropylene glycol diacrylate: Component (A), (Trade name: DPGDA, manufactured by Daicel-Allnex Ltd.)
 Hexanediol diacrylate: Component (A), (Trade name: Viscoat #230, manufactured by Osaka Organic Chemical Industry Co., Ltd.)
 Neopentyl glycol diacrylate hydroxypivalate (Trade name: Miramer M210, manufactured by Toyo Chemicals Co., Ltd.)
(E) (Meta)Acrylic Monomer Having a Hydroxyl Group:
 4-hydroxybutyl acrylate (Trade name: 4-HBA, manufactured by Osaka Organic Chemical Industry Co., Ltd.)

<(D) Photopolymerization Initiator>
TPO: 2,4,6-trimethylbenzoyl diphenyl phosphine oxide (manufactured by Lamberti S.p.A.)

<Sensitizer>
DETX: 2,4-diethylthioxanthone (manufactured by Lambson Ltd.)

<Polymerization Inhibitor>
MEHQ (hydroquinone monomethyl ether)
HQ (hydroquinone)

<Leveling Agent>
BYK-331 (polyester-modified polydimethylsiloxane, manufactured by BYK-Chemie)

<Ink Composition for Photo-Curable Inkjet Printing>

A mixture obtained by compounding a pigment, a pigment dispersant, and a photopolymerizable compound so as to have the compounding formulation (% by mass) shown in Table 1 was dispersed using an Eiger mill (using a zirconia beads having a diameter of 0.5 mm as a medium) to obtain a conc base. Using the obtained conc base, a photopolymerization initiator, a sensitizer, a polymerization inhibitor, and a leveling agent were compounded so as to have the compounding formulation (% by mass) shown in Table 1 to obtain ink compositions for photo-curable inkjet printing in Examples 1 to 15 and Comparative examples in 1 to 5.

(Corrugated Cardboard Base Material)
K liner, C liner (Pre-Coating Agent)

45 parts by mass of calcium carbonate with an average particle size of 0.05 μm, 25 parts by mass of styrene-maleic acid resin (a solid content: 25%) with an acid value of 170 mgKOH/g, and 30 parts by mass of water were dispersed with a bead mill to obtain a 45% slurry of calcium carbonate. 80 parts by mass of 45% slurry of calcium carbonate and 20 parts by mass of styrene-maleic acid resin (a solid content: 25%) with an acid value of 170 mgKOH/g were mixed and stirred to obtain a pre-coating agent.

(Coating of Pre-Coating Agent to K Liner)

The pre-coating agent adjusted above was coated to a K liner so as to have about 4 g/m$^2$ of coating amount using a 0.1 mm mear bar. Next, the surface coated with the pre-coating agent was dried by hot air drying.

<Evaluation on Ink Composition for Photo-Curable Inkjet Printing and Printed Matter>

Using the ink compositions for photo-curable inkjet printing in Examples 1 to 15 and Comparative examples 1 to 5, viscosity, storage stability, odor, and ejection stability of the ink composition, odor, curability, bending resistance, and abrasion resistance of printed matter were evaluated according to the following evaluation methods and evaluation criteria. The results are shown in Table 1.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Pigment | | | | | | | | | | |
| PY150 | | | | | | | | | | |
| PV19 | | | | | | | | | | 2.60 |
| PB15:4 | 2.60 | 2.60 | 2.60 | 2.60 | 2.60 | 2.60 | 2.60 | 2.60 | 2.60 | |
| PO13 | | | | | | | | | | |
| PG7 | | | | | | | | | | |
| PV23 | | | | | | | | | | |
| PB7 | | | | | | | | | | |
| Pigment dispersant | | | | | | | | | | |
| PB822 | 1.05 | 1.05 | 1.05 | 1.05 | 1.05 | 1.05 | 1.05 | 1.05 | 1.05 | 1.05 |
| Photopolymerizable compound | | | | | | | | | | |
| Amine-modified oligomer | 10.00 | 4.00 | 7.00 | 14.00 | 10.00 | 10.00 | 10.00 | 10.00 | 10.00 | 10.00 |
| Ethyl carbitol acrylate | 6.00 | 6.00 | 6.00 | 6.00 | 6.00 | 6.00 | 6.00 | 6.00 | 6.00 | 6.00 |
| Tripropoxylated neopentyl glycol diacrylate | 2.00 | 2.00 | 2.00 | 2.00 | 10.00 | 2.00 | 2.00 | 2.00 | 2.00 | 2.00 |
| Ethoxylated(3) trimethylolpropane triacrylate | 8.00 | 8.00 | 8.00 | 8.00 | | 8.00 | 8.00 | 8.00 | 8.00 | 8.00 |
| 4-hydroxybutyl acrylate | 17.70 | 17.70 | 17.70 | 17.70 | 17.70 | 25.55 | 17.70 | 17.70 | 17.70 | 17.70 |
| 1,6-hexanediol diacrylate | 35.85 | 41.85 | 38.85 | 31.85 | 35.85 | 28.00 | 2.00 | 2.00 | 2.00 | 35.85 |
| 3-methyl-1,5-pentanediol diacrylate | 2.00 | 2.00 | 2.00 | 2.00 | 2.00 | 2.00 | 35.85 | 3.00 | 2.00 | 2.00 |
| Dipropylene glycol diacrylate | 3.00 | 3.00 | 3.00 | 3.00 | 3.00 | 3.00 | 3.00 | 35.85 | 3.00 | 3.00 |
| Neopentyl glycol diacrylate hydroxypivalate | 2.00 | 2.00 | 2.00 | 2.00 | 2.00 | 2.00 | 2.00 | 2.00 | 35.85 | 2.00 |
| Initiator | | | | | | | | | | |
| TPO | 6.00 | 6.00 | 6.00 | 6.00 | 6.00 | 6.00 | 6.00 | 6.00 | 6.00 | 6.00 |
| Sensitizer | | | | | | | | | | |
| DETX | 1.00 | 1.00 | 1.00 | 1.00 | 1.00 | 1.00 | 1.00 | 1.00 | 1.00 | 1.00 |
| Polymerization inhibitor | | | | | | | | | | |
| MEHQ (hydroquinone monomethyl ether) | 1.90 | 1.90 | 1.90 | 1.90 | 1.90 | 1.90 | 1.90 | 1.90 | 1.90 | 1.90 |
| HQ (hydroquinone) | 0.40 | 0.40 | 0.40 | 0.40 | 0.40 | 0.40 | 0.40 | 0.40 | 0.40 | 0.40 |
| Leveling agent | | | | | | | | | | |
| BYK331 | 0.50 | 0.50 | 0.50 | 0.50 | 0.50 | 0.50 | 0.50 | 0.50 | 0.50 | 0.50 |
| | 100 | 100 | 100 | 100 | 100 | 100 | 100 | 100 | 100 | 100 |
| Viscosity (cps/25° C.) | 18.5 | 12.5 | 15.5 | 22.5 | 14.0 | 20.0 | 18.0 | 22.5 | 22.5 | 18.4 |
| Storage stability | ○ | ○ | ○ | ○ | ○ | ○ | ○ | ○ | ○ | ○ |
| Ejection stability | ○ | ○ | ○ | ○ | ○ | ○ | ○ | ○ | ○ | ○ |
| Curability | ○ | Δ | ○Δ | ○ | ○ | ○ | ○ | ○ | ○ | ○ |
| Ink odor | ○ | ○ | ○ | ○ | ○ | ○ | ○ | ○ | ○ | ○ |
| Coating film odor | ○ | ○ | ○ | ○ | ○ | ○ | ○ | ○ | ○ | ○ |
| Bending resistance | ○ | ○ | ○ | ○ | ○ | ○ | ○ | ○ | ○ | ○ |
| Abrasion resistance | ○ | ○ | ○ | ○ | Δ | Δ | ○ | ○ | ○ | ○ |

| | Example | | | | | Comparative example | | | | |
|---|---|---|---|---|---|---|---|---|---|---|
| | 11 | 12 | 13 | 14 | 15 | 1 | 2 | 3 | 4 | 5 |
| Pigment | | | | | | | | | | |
| PY150 | 2.60 | | | | | | | | | |
| PV19 | | | | | | | | | | |
| PB15:4 | | | | | | 2.60 | 2.60 | 2.60 | 2.60 | 2.60 |
| PO13 | | 2.60 | | | | | | | | |
| PG7 | | | 2.60 | | | | | | | |
| PV23 | | | | 2.60 | | | | | | |
| PB7 | | | | | 2.60 | | | | | |
| Pigment dispersant | | | | | | | | | | |
| PB822 | 1.05 | 1.05 | 1.05 | 1.05 | 1.05 | 1.05 | 1.05 | 1.05 | 1.05 | 1.05 |
| Photopolymerizable compound | | | | | | | | | | |
| Amine-modified oligomer | 10.00 | 10.00 | 10.00 | 10.00 | 10.00 | 2.00 | 19.00 | 10.00 | 10.00 | 6.00 |
| Ethyl carbitol acrylate | 6.00 | 6.00 | 6.00 | 6.00 | 6.00 | 6.00 | 6.00 | | 26.00 | 2.00 |
| Tripropoxylated neopentyl glycol diacrylate | 2.00 | 2.00 | 2.00 | 2.00 | 2.00 | 2.00 | 2.00 | | | 2.00 |
| Ethoxylated(3) trimethylolpropane triacrylate | 8.00 | 8.00 | 8.00 | 8.00 | 8.00 | 8.00 | 8.00 | 4.00 | 10.00 | 3.50 |
| 4-hydroxybutyl acrylate | 17.70 | 17.70 | 17.70 | 17.70 | 17.70 | 19.00 | 5.70 | 19.00 | 5.00 | 12.05 |
| 1,6-hexanediol diacrylate | 35.85 | 35.85 | 35.85 | 35.85 | 35.85 | 42.55 | 36.85 | 46.55 | 28.55 | 61.00 |

TABLE 1-continued

|  | | | | | | | | | | |
|---|---|---|---|---|---|---|---|---|---|---|
| 3-methyl-1,5-pentanediol diacrylate | 2.00 | 2.00 | 2.00 | 2.00 | 2.00 | 2.00 | 2.00 | 2.00 | 2.00 | |
| Dipropylene glycol diacrylate | 3.00 | 3.00 | 3.00 | 3.00 | 3.00 | 3.00 | 3.00 | 3.00 | 3.00 | |
| Neopentyl glycol diacrylate hydroxypivalate | 2.00 | 2.00 | 2.00 | 2.00 | 2.00 | 2.00 | 2.00 | 2.00 | 2.00 | |
| Initiator | | | | | | | | | | |
| TPO | 6.00 | 6.00 | 6.00 | 6.00 | 6.00 | 6.00 | 6.00 | 6.00 | 6,00 | 6.00 |
| Sensitizer | | | | | | | | | | |
| DETX | 1.00 | 1.00 | 1.00 | 1.00 | 1.00 | 1.00 | 1.00 | 1.00 | 1.00 | 1.00 |
| Polymerization inhibitor | | | | | | | | | | |
| MEHQ (hydroquinone monomethyl ether) | 1.90 | 1.90 | 1.90 | 1.90 | 1.90 | 1.90 | 1.90 | 1.90 | 1.90 | 1.90 |
| HQ (hydroquinone) | 0.40 | 0.40 | 0.40 | 0.40 | 0.40 | 0.40 | 0.40 | 0.40 | 0.40 | 0.40 |
| Leveling agent | | | | | | | | | | |
| BYK331 | 0.50 | 0.50 | 0.50 | 0.50 | 0.50 | 0.50 | 0.50 | 0.50 | 0.50 | 0.50 |
|  | 100 | 100 | 100 | 100 | 100 | 100 | 100 | 100 | 100 | 100 |
| Viscosity (cps/25° C.) | 19.0 | 19.5 | 20.2 | 19.8 | 20.8 | 10.5 | 27.5 | 15.5 | 15.5 | 14.0 |
| Storage stability | ○ | ○ | ○ | ○ | ○ | ○ | x | ○ | ○ | ○ |
| Ejection stability | ○ | ○ | ○ | ○ | ○ | ○ | ○ | ○ | ○ | ○ |
| Curability | ○ | ○ | ○ | ○ | ○ | x | ○ | ○ | ○ | ○ |
| Ink odor | ○ | ○ | ○ | ○ | ○ | ○ | ○ | ○ | ○ | ○ |
| Coating film odor | ○ | ○ | ○ | ○ | ○ | ○ | ○ | ○ | ○ | ○ |
| Bending resistance | ○ | ○ | ○ | ○ | ○ | ○ | ○ | x | ○ | x |
| Abrasion resistance | ○ | ○ | ○ | ○ | ○ | Δ | Δ | x | x | ○ |

(Measurement of Viscosity of Ink Composition for Photo-Curable Inkjet Printing)

A viscosity of the ink composition for photo-curable inkjet printing was measured under a condition of a temperature of 25° C. and a rotor rotation speed of 20 rpm using the E-type viscometer (RE100L-type viscometer, manufactured by Toki Sangyo Co., Ltd.).

(Storage Stability)

A state of the ink composition for photo-curable inkjet printing after being taken in a glass bottle, sealed, and stored at 70° C. for 7 days was evaluated according to the following evaluation criteria.

○: Neither thickening nor sedimentation was observed in the ink composition for photo-curable inkjet printing.

Δ: Thickening and sedimentation were observed to an extent that the ink composition for photo-curable inkjet printing returned to its original state when shaken lightly.

x: Thickening and sedimentation were observed to an extent that the ink composition for photo-curable inkjet printing did not return to its original state when shaken strongly.

(Odor)

Odor of the ink composition for photo-curable inkjet printing was evaluated according to the following evaluation criteria.

○: Low odor was observed.

x: High odor was observed.

(Ejection Stability)

An inkjet recording device equipped with an inkjet nozzle and an ink composition for photo-curable inkjet printing were placed under an atmospheric temperature of 25° C. for 24 hours, and each temperature of the inkjet recording device and the ink composition for photo-curable inkjet printing was set to 25° C. Then, at 25° C., printing (typing) was continuously performed on a K liner and a C liner coated with pre-coating using the ink composition, and ejection stability was evaluated according to the following evaluation criteria.

○: The ink composition was able to be ejected stably without any printing disorder.

Δ: The ink composition was able to be ejected almost stably, though there was some printing disorder.

x: The ink composition had printing disorder or was not able to be ejected stably.

(Curability)

The inkjet recording device and the ink composition for photo-curable inkjet printing were placed under an atmospheric temperature of 25° C. for 24 hours, and each temperature of the inkjet recording device and the ink composition for photo-curable inkjet printing was set to 25° C. Then, at 25° C., printing (typing) was continuously performed on the pre-coated K liner and C liner using the ink composition for photo-curable inkjet printing, and then the ink composition was cured with a UV integrated light amount of 180 mJ/cm$^2$ by use of a UV-LED light lamp manufactured by Phoseon Technology at a distance of 2 cm between the lamp and the ink-coated surface. The obtained curable coating film was rubbed with a cotton swab, and curability was evaluated depending on a degree of rubbing-off according to the following evaluation criteria.

○: The film was not rubbed off.

Δ: The film was slightly rubbed off.

x: The film was rubbed off.

(Odor)

The ink composition was printed on the pre-coated K liner and C liner, and odor of the curable coating film was evaluated.

○: Low odor was observed.

x: High odor was observed.

(Bending Resistance)

The ink composition was printed on the pre-coated K liner and C liner, and the printed material was bent at 90° C. and evaluated according to the following evaluation criteria.

○: Neither ruled line cracks nor fine cracks occurred in the coating film when bent.

Δ: Fine cracks occurred in the coating film when bent.

x: Ruled line cracks occurred in the coating film when bent.

(Abrasion Resistance)

A degree of rubbing-off of the cured film from the pre-coated K liner and C liner when the cured film obtained in the above-described evaluation of curability was rubbed with a bleached cloth 500 g×200 times using a Gakushin-Type fastness tester (manufactured by Daiei Kagaku Seiki MFG Co., Ltd.) was visually observed and evaluated according to the following evaluation criteria.

◯: The cured film was not rubbed off.

Δ: The cured film had a scratch on its surface.

x: The cured film was rubbed off and the sheet was visible.

As shown in Table 1, when the ink compositions of the present invention in Examples 1 to 15 were used, the ink compositions had an excellent storage stability, low odor, and a good ejection stability. Moreover, the printed matters obtained by using these ink compositions had low odor, an excellent curability, and excellent bending resistance and abrasion resistance.

On the other hand, the printed matter obtained by using the ink composition in Comparative example 1, in which the content of the component (A) was small, was inferior in curability and abrasion resistance. The ink composition in Comparative example 2, in which the content of the component (A) was large, was inferior in storage stability, and the printed matter obtained by using this ink composition was inferior in abrasion resistance. The printed matter obtained by using the ink composition of Comparative example 3, in which the content of the component (B) was small, was inferior in bending resistance and abrasion resistance. The printed matter obtained by using the ink composition of Comparative example 4, in which the content of the component (B) was large, was inferior in abrasion resistance. The printed matter obtained by using the ink composition of Comparative example 5, in which the content of the component (C) was large, was inferior in bending resistance.

The invention claimed is:

1. An ink composition for photo-curable inkjet printing, comprising (A) an acrylicated amine compound having two photopolymerizable functional groups and two amino groups in a molecule, (B) a (meth)acrylic monomer having an alkoxy group, and (C) at least one selected from the group consisting of hexanediol acrylate, 3-methyl-1,5-pentanediol diacrylate, dipropylene glycol diacrylate, and neopentyl glycol diacrylate hydroxypivalate, wherein a content of the component (A) is 3 to 18% by mass in the ink composition, wherein a content of the component (B) is 15 to 25% by mass in the ink composition, and wherein the component (B) comprises a polyfunctional (meth)acrylate monomer, and a content of the polyfunctional (meth) acrylate monomer is 30 to 100% by mass in the component (B), and wherein a content of the component (C) is 30 to 60% by mass in the ink composition.

2. The ink composition for photo-curable inkjet printing of claim 1, further comprising (D) a photopolymerization initiator.

3. The ink composition for photo-curable inkjet printing of claim 1, further comprising (E) a (meth)acrylic monomer having a hydroxyl group, wherein a content of the component (E) is 3 to 20% by mass in the ink composition.

4. The ink composition for photo-curable inkjet printing of claim 1, further comprising (F) a colorant.

* * * * *